United States Patent

Swain et al.

Patent Number: 5,112,197
Date of Patent: May 12, 1992

[54] CROSS GROOVE JOINT SOCKET PLATE TORQUE RESTRAINT ASSEMBLY FOR A VARIABLE DISPLACEMENT COMPRESSOR

[75] Inventors: James C. Swain, Columbus; John P. Wilcox, Delaware; David L. Thomas, Columbus, all of Ohio

[73] Assignee: General Motors Corporation, Detroit, Mich.

[21] Appl. No.: 591,993

[22] Filed: Oct. 1, 1990

[51] Int. Cl.⁵ .......................... F04B 1/26; F16H 23/04
[52] U.S. Cl. ....:............................ 417/222 R; 74/60; 417/269; 417/222 S
[58] Field of Search .................. 417/222, 269; 92/12.2, 92/71; 384/497; 74/60

[56] References Cited

U.S. PATENT DOCUMENTS

| | | | |
|---|---|---|---|
| 2,259,881 | 10/1941 | Foley | 384/497 |
| 2,917,931 | 12/1959 | Sherman | 92/12.2 |
| 2,947,182 | 8/1960 | Wahlmark | 74/60 |
| 3,067,595 | 12/1962 | Faure | 464/144 |
| 3,218,827 | 11/1965 | Aucktor | 464/146 |
| 4,221,545 | 9/1980 | Terauchi | 74/60 |
| 4,586,874 | 5/1986 | Hiraga et al. | 417/222 R |
| 4,664,604 | 5/1987 | Terauchi | 417/222 |
| 4,729,718 | 3/1988 | Ohta et al. | 417/222 |
| 4,737,079 | 4/1988 | Kurosawa et al. | 417/222 |
| 4,784,045 | 11/1988 | Terauchi | 417/26.9 |
| 4,850,811 | 7/1989 | Takai | 417/222 |
| 4,878,882 | 11/1989 | Welschof | 464/144 |

FOREIGN PATENT DOCUMENTS

| | | | |
|---|---|---|---|
| 0338762 | 10/1989 | European Pat. Off. | 417/269 |
| 972819 | 10/1964 | United Kingdom . | |
| 1042721 | 9/1966 | United Kingdom . | |

Primary Examiner—Richard A. Bertsch
Assistant Examiner—Peter Karytnyk
Attorney, Agent, or Firm—William A. Schuetz

[57] ABSTRACT

An assembly for providing socket plate torque restraint for a variable displacement wobble plate refrigerant compressor includes a non-rotary cross groove joint. The joint has a cylindrical outer race, a cylindrical inner race, slightly angled helical grooves in the races, a plurality of torque receiving balls and a cage for properly maintaining and positioning the balls in the cooperating grooves for operation. The joint is connected to a fixed anti-rotational shaft. The shaft is in the form of a sleeve and forms the inner race to effect torque restraint, but at the same time allow for translational axial motion of the socket plate. Radial and thrust bearings mount said socket plate relative to the rotary hub/journal. Lubricating fluid carried by the gaseous refrigerant lubricates the grooves and is then transferred by a passage extending from the grooves in the outer race to the radial/thrust bearings. The cross groove joint provides the ideal kinematic restraint action for the socket plate; the grooves on said inner and outer races and said cage effectively maintaining the balls situated substantially in a single torque transmitting plane that defines and bisects the joint angle. The joint effectively transmits the restraining torque of the joint to the anti-rotational shaft in a manner effective to substantially eliminate torsional vibration.

3 Claims, 2 Drawing Sheets

CROSS GROOVE JOINT SOCKET PLATE TORQUE RESTRAINT ASSEMBLY FOR A VARIABLE DISPLACEMENT COMPRESSOR

TECHNICAL FIELD

The present invention relates generally to variable displacement compressors, and more particularly, to an improved assembly for providing socket plate torque restraint for a variable displacement socket plate compressor.

BACKGROUND OF THE INVENTION

A popular type of refrigerant compressor for use in vehicle air conditioning systems involves a wobble or nutating drive mechanism to provide infinitely variable displacement. In this type of compressor, a plurality of cylinders are equally angularly spaced about a cylinder block and housing, and equally radially spaced from the axis of a central drive hub. A piston is mounted for reciprocating motion in each of the cylinders. A piston rod connects each piston to a non-rotatable socket or wobble plate that provides the nutating motion in response to a rotating drive shaft included in the central drive hub. The driving of the socket plate in a nutating path serves to impart the linear reciprocating motion to the pistons, thereby providing proper compressor operation. By varying the angle of the socket plate relative to the drive hub, through internal refrigerant gas pressure, the stroke of the pistons and, therefore, the displacement or capacity of the compressor is varied.

The action of the nutating socket plate in the refrigerant compressor inherently results in it being subjected to torque. In order for the compressor to properly function, the torque applied to the socket plate must be properly restrained; i.e. an equal and opposite torque must be transmitted to a fixed structure, such as to the compressor housing. A common method of restraining torque found in prior art socket plate compressors involves the use of guide pin/slider assembly such as that disclosed in U.S. Pat. No. 4,480,964 to Skinner, issued Nov. 6, 1984. The guide pin is fixed to the cylinder block and a ball guide is slidably mounted thereon and retained on the socket plate. The guide pin thus prevents the socket plate from rotating with the rotary drive plate and allows the torque applied to the socket plate to be restrained by transmitting an equal and opposite torque through the cylinder block to the fixed housing.

This torque restraint design for compressors undesirably produces torsional oscillations. It can be appreciated that the axis of the socket plate does not coincide with the axis of the drive hub, but rather varies through a variety of angular positions with respect to the drive hub as it travels in its nutating path. As a result of the variation of the angular relationship between the drive hub and the socket plate, as the non-rotating socket plate wobbles or nutates, a torsional acceleration and deceleration action results in the drive shaft. The torsional oscillation resulting from the alternating acceleration and deceleration of the drive shaft occurs twice per hub revolution. This torsional oscillation creates undesirable vibration within the compressor.

Thus, while this prior art torque restraint design for compressors has thus proved generally effective, there is some need for improvement to alleviate the vibration problem. More specifically, there is a need to provide a mechanism that prevents socket plate rotation without inducing torsional oscillation in the drive shaft. One approach to solving this problem is disclosed in the co-pending U.S. application entitled RZEPPA JOINT SOCKET PLATE TORQUE RESTRAINT ASSEMBLY FOR A VARIABLE DISPLACEMENT COMPRESSOR, filed Apr. 5, 1990, Ser. No. 07/504,817 and assigned to the assignee of the present invention. A spherical Rzeppa constant velocity joint is described as being utilized to uniformly restrain the socket plate motion relative to the drive mechanism, and thus prevent vibration. As is known, the Rzeppa joint by itself cannot accommodate the axial change of position of the socket plate as it operates through its range of motion. To perform this function according to this previous invention, a co-axial anti-rotation shaft is provided. It is keyed to the housing and slides axially to accommodate compressor adjustment between full and zero displacement.

Improvements to the socket plate torque restraint mechanism are appropriate to refine the operation. One area showing promise for improvement is concerned with efficiently accommodating this axial change of position of the socket plate. The ideal socket plate torque restraint mechanism prevents rotation in a manner such that the inertial torque reaction about the axis of the compressor drive hub and shaft is, or approaches, zero at any instant. The socket plate torque restraint mechanism produces an equal and opposite torque to that applied to the socket plate and carries it to a ground or fixed structure, such as the housing, within the compressor assembly. Such a socket plate torque restraint mechanism would be inexpensive, and at the same time very efficient in eliminating the deleterious vibration of the compressor. Its key parts would have features easier to machine, assemble and maintain.

SUMMARY OF THE INVENTION

Accordingly, it is a primary object of the present invention to provide an improved socket plate torque restraint mechanism that prevents socket plate rotation while substantially eliminating torsional vibration of the compressor.

It is still another object of the present invention to provide an assembly including a cross groove joint that efficiently transmits socket plate restraining torque through a non-rotary grounding shaft that is fixed to the compressor housing.

Still another object of the present invention is to provide a cross groove joint assembly that uniformly restrains the socket plate from rotational motion relative to the drive mechanism.

It is another object of the present invention to provide a socket plate torque restraint mechanism including a cross groove joint that allows the refrigerant compressor to operate at higher speeds while still minimizing torsional vibrations.

Another object of the present invention is to utilize a socket plate torque restraint mechanism with a cross groove joint providing substantially ideal kinematic restraint action for the socket plate through the use of a cross groove constant velocity joint.

It is a further object of the present invention to provide a socket plate torque restraint assembly utilizing a cross groove constant velocity joint that integrally accommodates the axial motion of the socket plate as it angulates through its range of operation.

It is an additional object of the present invention to provide a cross groove mechanism that substantially eliminates the vibration due to inertial torque acting on the drive hub and is less costly to machine, assemble and maintain than conventional torque restraint mechanisms.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved socket plate torque restraint assembly for a variable displacement socket or wobble plate compressor is provided. The torque restraint assembly offers the desirable quality of uniformly restraining the socket plate rotation relative to the rotating drive mechanism. This is accomplished in a way so as to substantially eliminate the inertial torque acting on the drive hub/shaft, and smoothing the rotating action, by grounding the socket plate to the compressor housing. This combination is effective in minimizing torsional oscillation or vibration of the compressor and allowing smooth, high speed operation. The assembly further efficiently accepts the translational axial motion of the socket plate and drive journal as they operate through the entire range of displacement positions.

Advantageously, the socket plate torque restraint assembly includes a cross groove constant velocity joint, such as is commonly used in the drive mechanism of a front wheel drive automobile. As is generally known in the art, the cross groove constant velocity joint includes an outer race, an inner race and a set of cooperating torque transmitting balls with retaining cage strategically positioned for proper operation at any angular position of the joint. According to the invention, the inner race is integral with a fixed or grounding shaft attached through the cylinder block to the compressor housing opposite the drive hub. The grounding shaft takes the form of an elongated sleeve concentrically surrounding the rotating drive shaft.

The outer race of the joint has a cylindrical inner surface with slightly angled, helical grooves; and similarly, the inner race is cylindrical with cooperating helical grooves; that is, grooves slightly angled in the opposite direction. Thus, the torque transmitting balls are retained in these cooperating generally axial, but non-parallel grooves. The helical profile of the grooves, assisted by a retaining cage, permit the balls to move axially essentially by rolling therein and be properly positioned and retained as the socket plate nutates during compressor operation. The cylindrical surfaces and slightly angled grooves make the joint not only more economical to machine, but also to assemble and maintain.

In accordance with the present invention, the outer race is attached to the socket plate. Since the inner race is integral with the fixed grounding sleeve, the socket plate is prevented from rotating through the action of the torque transmitting balls in between the outer race and inner race. The socket plate as a result, can wobble or nutate (no rotation) as it is being driven by the angled journal of the rotary drive hub.

As the socket plate nutates during compressor operation, the cross groove joint advantageously provides the correct kinematic restraint action for the socket plate. More specifically, the different positions of the socket plate define different joint angles between the axis of the drive shaft/hub and the axis of the socket plate. As the outer race changes position, it forces the torque transmitting balls to change position within the corresponding grooves between the outer race and the inner race. Advantageously, the balls are always situated in a single torque transmitting plane that bisects and thus defines the joint angle. The balls are held captive in a plane perpendicular to the plane common to both the axis of the socket plate and the grounding sleeve when the compressor is at zero displacement, and are always located at the true joint center.

Further, this crossing helical pattern of the cooperating grooves allows the accommodation of smooth axial translational movement of the socket plate relative to the compressor housing all the way to the position of full displacement. The action of the balls which is essentially rolling minimizes the friction at the joint interface. Lubricating fluid or oil entrained in the gaseous refrigerant is freely sprayed on the face of the grooves; thus assuring maximum compressor life and minimum maintenance. There is minimal sliding action associated with the action of the joint. In addition, radial lubricant passages extending from the grooves of the outer race advantageously transfer the oil captured in these grooves to both the radial bearing and the thrust bearing forming the main rotational interface of the joint. As a result, the cross groove joint efficiently performs its torque restraint function without significant frictional forces. The joint operates to minimize slight pressure variations and reduce outside force effects. The cross grooves and captive balls provide smooth relative movement so that the compressor operation is not speed sensitive.

In the preferred embodiment of the invention, the drive pins (only one shown) pivotally connecting the drive hub to the drive journal move along a compensating kidney slot in the hub to assure that the connecting rods to the pistons remain substantially straight in all adjusted positions of the joint. At the zero displacement position, additional compensating action is desirable to initiate a short-stroke movement for return of the pin toward the position corresponding to full displacement of the compressor. In this regard, a leaf spring advantageously cradles the pin as the zero displacement orientation is approached, and biases the pin and socket plate to return toward the full displacement position.

Considering the combination of these features, the concept of applying the cross groove constant velocity joint of the present invention to a variable stroke compressor ensures that for any constant compressor speed, angular accelerations/decelerations and resultant vibrations that would otherwise be induced in the rotating drive hub are substantially non-existent. This is true throughout the complete rotation of the drive hub and in any adjusted position. In essence, the uniform restraining action available from the several features of the cross groove joint advantageously eliminates the uneven inertial torque common in prior art arrangements.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
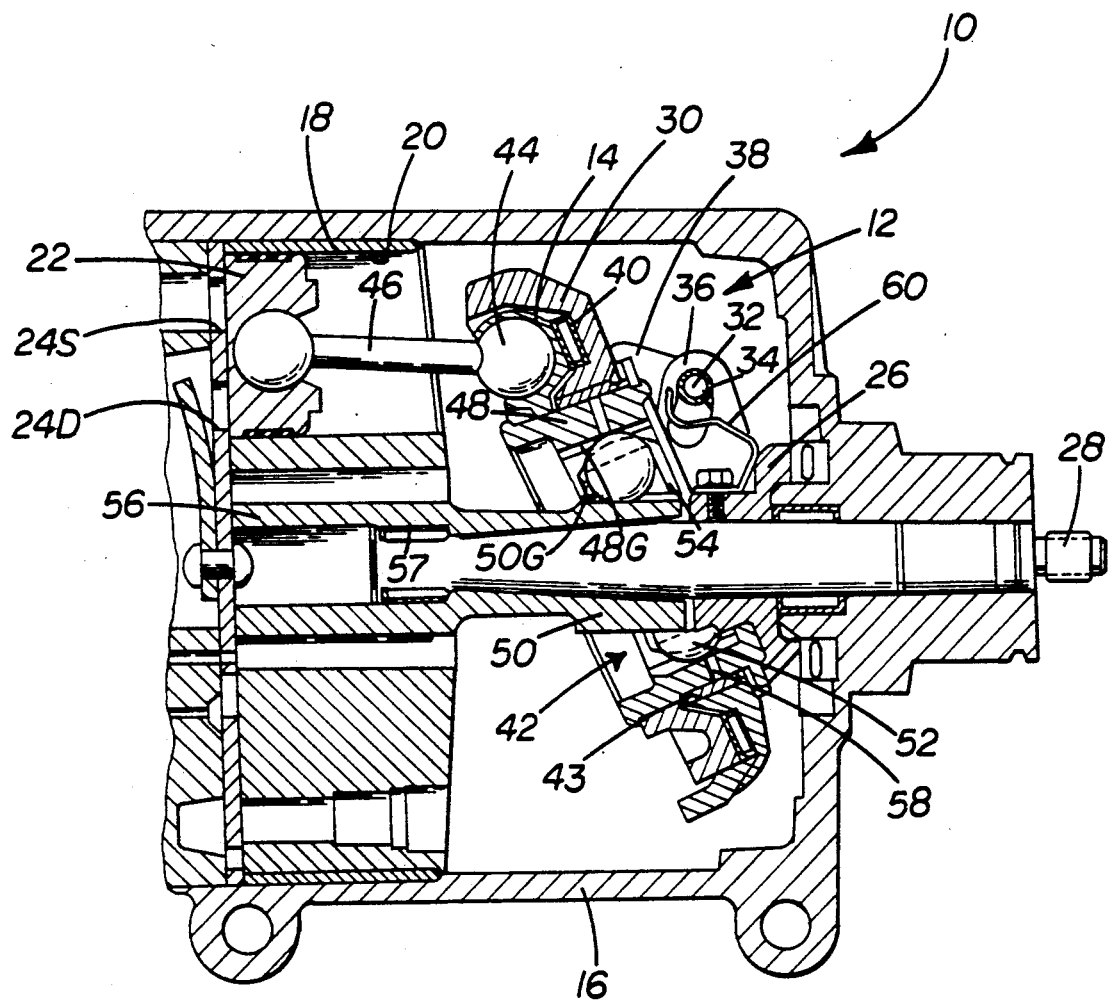
FIG. 1 is a partial cross-sectional view of the variable displacement socket plate compressor including the improved socket plate torque restraint assembly of the present invention and adjusted to full compressor displacement.
Figure 2:
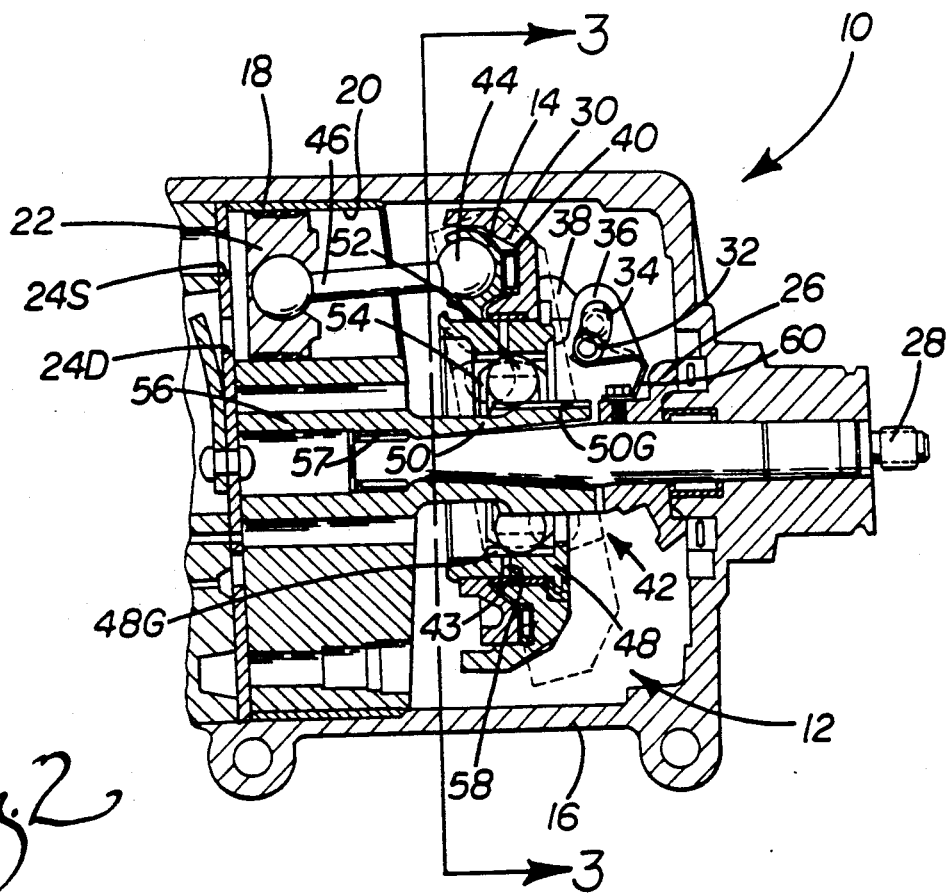
FIG. 2 is a partial cross-sectional view of the variable displacement socket plate compressor showing the two additional compressor displacement orientations, with zero displacement shown in full line and an intermediate or mid-point displacement shown in phantom.

Reference is made to FIGS. 1 and 2 illustrating a variable displacement socket plate compressor 10 including an improved socket plate torque restraint assembly 12 constructed in accordance with the teachings of the present invention. As will be appreciated from a review of the following description, in conjunction with the drawings of the preferred embodiment, the restraint assembly 12 efficiently transmits torque from socket plate 14 of the compressor 10 to compressor housing 16 via the cylinder block 18 while substantially reducing torsional vibrations.

The cylinder block 18 has a plurality of cylinder bores 20 (only one shown in FIGS. 1 and 2). The preferred embodiment of the present invention is contemplated for use with a refrigerant compressor having five cylinder bores 20 (see FIG. 3). However, it can be appreciated that vehicle refrigerant compressors can be designed with a fewer or greater number of cylinder bores 20.

A piston 22 is slidingly engaged for reciprocable motion within each of the cylinder bores 20. The reciprocating action of the pistons 22 compresses the refrigerant. The compressed refrigerant passes through discharge ports 24D of the compressor 10, and after further processing, is utilized by the air conditioning system of the vehicle (not shown) to condition or cool air being directed to the vehicle interior. The refrigerant is returned to the compressor through suction ports 24S to complete the cycle.

A drive hub 26 is axially aligned with the cylinder block 18 at the opposite end of the compressor housing 16. The drive hub 26 is attached to a drive shaft 28 that extends externally of the compressor housing to engage the drive mechanism of the automobile engine (not shown). During engine operation, power is transmitted from the engine to the drive shaft 28 and thence to the drive hub 26 to operate the compressor.

A drive journal 30 is positioned to provide the actual driving action to reciprocate the pistons 22. To accomplish this purpose, the journal 30 is connected to the drive hub 26 with two drive pins 32 (only one shown) slidably received within cooperating kidney slots 34 formed on flanges 36 of the drive hub 26. Each drive pin 32 is press fit into holes formed in a cooperating set of journal ears 38. The engagement between the journal 30 and the drive hub 26 (see FIG. 1), thus forces the journal 30 to rotate with the drive hub 26. According to the invention, and as will be described in more detail below, a non-rotary cross groove joint 42 supports the journal 30. A radial bearing 43 in the form of an annular bushing is located at the rotary interface.

The socket plate 14 is also in juxtaposition with the journal 30; the journal being mounted for relative rotation through an annular thrust bearing 40. The socket plate 14 can thus be prevented from rotating by its connection to the cross groove joint 42. By the joint 42 constraining rotation, the socket plate 14 is thus allowed the desired wobble action. The radial bearing 43 in combination with the thrust bearing 40 forms the desired rotational interface between the journal 30 and the joint 42.

In operation, as the drive hub 26 is driven, the journal 30 is thus freely rotated. This rotation in turn is capable of imparting a nutating motion to the non-rotary socket plate 14. The angle of the journal 30 to the drive hub 26 can be varied, thus determining the precise path traveled by the socket plate 14. More specifically, when the journal 30 is positioned at a substantially maximum angle, as shown in FIG. 1, the nutating motion of the socket plate 14 is at a maximum. Thus, in this orientation, and considering the connection of each piston 22 to the socket plate 14 through a ball 44 of a piston rod 46, it should be appreciated that the pistons 22 are reciprocated through their full stroke. As a result, the compressor 10 operates at full stroke displacement or maximum capacity.

Conversely, when the journal 30 is adjusted so as to be substantially perpendicular to the drive hub 26, as shown in the full line in FIG. 2, the journal 30 spins without imparting nutating motion to the socket plate 14. The pistons 22 do not reciprocate in this operative situation. Thus, the operation of the compressor 10 is effectively terminated at this position. It can be appreciated that by infinitely varying the angle of the journal 30 anywhere between these two extremes (see phantom mid-point position in FIG. 2), the operation of the compressor 10 at an infinite number of intermediate capacity levels may be achieved.

It can be appreciated that while the non-rotary socket plate 14 is traveling in its nutating path, it is being subjected to torque as a result of the driving force exerted by the rotating journal 30. Proper operation of the compressor 10 mandates that the socket plate torque be restrained. More particularly, a torque equal and opposite to the torque applied to the socket plate 14 must be transmitted to ground, i.e. a fixed structure such as the compressor housing 16. The assembly of the present invention efficiently accomplishes this important task. The inventive assembly substantially eliminates the inertial torque acting on the drive shaft 28, thus allowing the compressor 10 to operate at higher speed and substantially without torsional vibration.

Thus, according to an important aspect of the invention, the torque applied to the socket plate 14 is restrained through the use of the cross groove joint 42, which includes an outer race 48 and an inner race 50. The races 48, 50 are preferably cylindrical and have a plurality of cooperating grooves 48G, 50G, respectively, with each pair of cooperating grooves 48G, 50G receiving one of a plurality of torque transmitting balls 52 (see FIG. 3). In the preferred embodiment, the cross groove joint 42 includes six torque transmitting grooves/balls. However, it can be appreciated that a greater number of pairs of grooves and balls may be utilized. A cage 54 is provided to assure retention and positioning of the torque transmitting balls 52 in a common plane within the cross groove joint 42.

The inner race 50 is formed on a fixed shaft in the form of an elongated sleeve 56; the sleeve being formed integral with or fixedly attached to the cylinder block 18. The sleeve 56 rotationally receives and supports the distal end of the drive shaft 28. Needle bearings 57 are provided to mount the end of the drive shaft 28.

As is indicated in FIGS. 1 and 2, the grooves 50G formed on the inner race 50 extend generally axially along the outer cylindrical peripheral surface of the end of the shaft 56. The grooves 48G similarly generally axially extend along the inner cylindrical surface that defines the outer race 48. Because the operative surfaces are cylindrical rather than spherical, or other more complicated profile, substantial manufacturing and related costs are saved.

Figure 3:
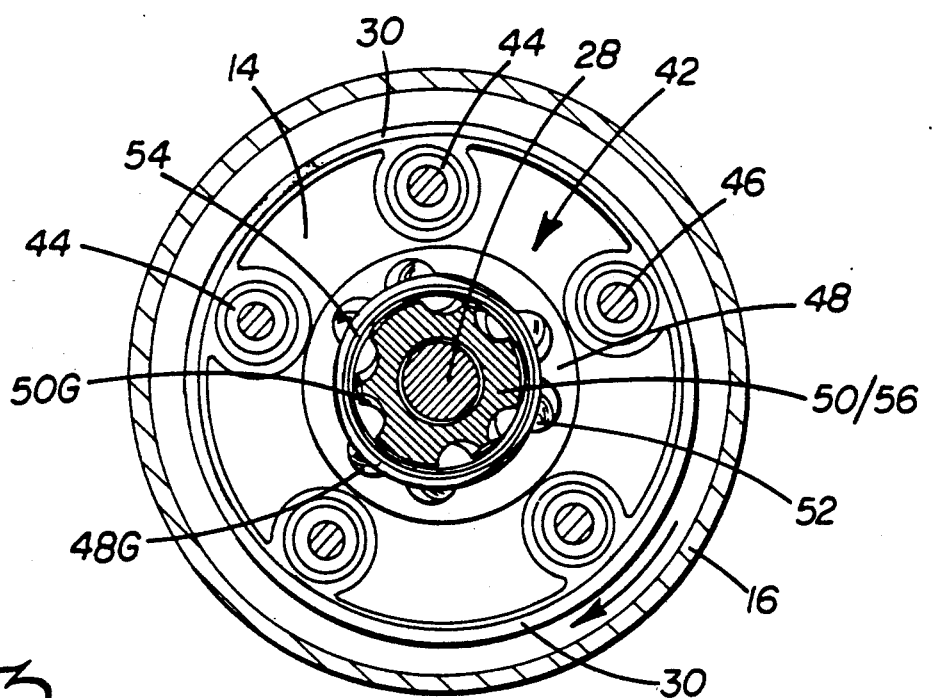
FIG. 3 is a cross-sectional view of the compressor with the cross groove constant velocity joint taken along the lines 3—3 in FIG. 2.

A review of FIG. 3 provides further insight into the advantageous design of the joint 42. As is shown, the grooves 48G on the outer race 48 are slightly angled and helical in nature and thus non-parallel so that they form a crossing pattern with the slightly angled, helical grooves 50G formed on the inner race 50. As shown, each pair of grooves 48G, 50G with the associated cage 54 thus captively holds the associated ball 52.

It can be appreciated that as the socket plate 14/journal 30 assembly travels between zero displacement operation and full displacement operation, the balls 52 move axially essentially by rolling within the grooves 48G, 50G. This basic low friction movement and positioning of the balls within the joint 42 thus provides substantially ideal kinematic action. Minimum vibration is realized from this arrangement of effecting torque restraint.

When torque is transferred between the races 48, 50 having the crossing grooves 48G, 50G, the captive balls 52 therein are urged axially. One-half of the balls 52 are urged in one direction and the other half of the balls are urged in the opposite direction. The balls 52 thus seek a plane that defines or bisects the joint angle between the axis of the inner race 50 and the axis of the outer race 48. The defined angle between the axis of the drive hub 26 and the axis of the socket plate 14 tracks the joint angle. The cage 54 advantageously assists in this function by keeping all of the balls in a common plane. Thus, the constant velocity (zero acceleration/deceleration) ratio defined by this structure of the joint 42 further assists in eliminating undesirable torsional vibration or imbalance, bringing about the desired smoothness of operation over the full range of adjustment.

To explain the desired result another way, the non-rotary socket plate 14 is positioned and nutated by the angled journal 30 on the drive hub 26 in a manner such that the inertial torque reaction about the central axis of the compressor 10 (that is, the axis of the drive shaft 28) is at or approaching zero at any instant. The uniform motion established between the drive hub 26/shaft 28 and the socket plate 14 is a result of the proper positioning of the torque transmitting balls 52 in the defined plane between the races 48, 50. In addition, axial balance is maintained by the opposing directional motion of the balls 52, as described above. The motion of the outer race 48 with respect to the inner race 50 is facilitated by the substantially rolling engagement of the balls 52 within the cooperating grooves 48G, 50G. Through the range of nutating motion of the socket plate 14, the races 48, 50 assume the relative angular position with respect to each other that is ideally suited for eliminating momentary accelerations or decelerations, and thus deleterious torsional vibrations are substantially eliminated.

The axially extending, slightly angled, helical grooves on the races 48, 50 advantageously provides the desired controlled movement of the socket plate 14 over the limited range of axial motion. In essence, the balls 52 carry the outer race 48 along the fixed inner race 50 in a precise path without variation. It is thus an important advantage of the invention that the joint 42 itself accommodates the relative translational movement of the joint components as the compressor displacement varies. There is no need for separate sliding parts, as have been deemed necessary in the past.

Lubrication passages 58 to the grooves 48G collect the residual oil and advantageously deliver it to the annular radial bearing 43. From this point the oil continues through the gap between the rotating journal 30 and the socket plate 14 to lubricate the thrust bearing 40.

The most efficient upstroking and destroking of the compressor 10 requires that the pivoting arrangement of the journal 30 be about an axis that is controlled and maintained stable; said axis to be perpendicular at all times to the direction of motion of the pistons 22. This is accomplished by the pin(s) 32 being guided in a controlled fashion in the kidney slot(s) 34, and the cooperation of the lateral guide faces of the flange(s) 36 on the hub 26 and the journal ear(s) 38 (see FIGS. 1 and 2).

In the full displacement or full upstroke position as shown in FIG. 1, the pin 32 within the slot 34 is positioned at the maximum radial position. In the zero displacement position, as shown in full line in FIG. 2, the pin 32 is at the innermost radial position of the slot 34. Return springs 60 (one shown) are attached to the drive hub 26, each spring cooperatively engaging the related drive pin 32 as the socket plate 14 moves towards zero displacement operation. The springs 60 act to bias on a short stroke the socket plate 14 back towards the full displacement position.

As a result of these features, the socket plate 14/journal 30 assembly pivots without skewing side-to-side and while maintaining the radial position. In other words, it is radially positioned relative to the compressor housing 16, the cylinder block 18, the bores 20, and thus the pistons 22 at all stroke positions.

The radial stability of the assembly 12 is further assisted by the location of the grooves 48G, 50G on equal radii in the cross groove joint 42, allowing the socket plate 14 to cooperatively travel with the journal 30. Thus, the proper alignment of the plate 14/journal 30 assembly is further assured by this design integration.

Despite all these features, the use of a cross groove joint 42 introduces a modest radial inertial imbalance to the compressor 10. By proper design this can be held to acceptable values and the imbalance can be judiciously allocated across the range of operating strokes as desired.

To review the operation of the torque restraint assembly 12 of the invention, as the journal 30 drives the non-rotary socket plate 14 in its nutating path, the socket plate is subjected to undesirable torque. The non-rotary cross groove joint 42 prevents the socket plate 14 from rotating and restrains the torque imposed thereon. The cooperating action of the outer race 48, inner race 50, torque transmitting balls 52 and cage 54 of the joint 42 provide the desired balanced and controlled kinematic restraint. The sleeve 56 on which the inner race 50 is formed is firmly grounded to the cylinder block 18 and housing 16. As a result, the unique torque restraint assembly 12 advantageously restrains the torque applied to the socket plate 14 and efficiently and economically transmits the restraining torque to the fixed compressor housing 16 to substantially eliminate compressor vibration.

In summary, numerous benefits are obtained by use of the present invention. The variable displacement socket plate compressor 10 includes a torque restraint assembly 12 that prevents the socket plate 14 from rotating while restraining its applied torque and transmitting it to the fixed compressor housing 16. The torque restraint assembly 12 includes the cross groove joint 42 in combination with the fixed co-axial sleeve 56 that accommodates relative translational motion and efficiently restrains the socket plate motion relative to the rotating journal 30.

The foregoing description of a preferred embodiment of the invention has been presented for purposes of illustration or description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. An assembly for providing torque restraint of a socket plate for a variable displacement wobble plate compressor having a fixed housing and cylinder block and a rotatable drive hub, comprising:
   a non-rotary cross groove joint means with grooves having longitudinal axes that intersect for restraining torque applied to said socket plate by said hub and for reducing vibration;
   shaft means connected to said joint means;
   means for fixedly mounting said shaft means on said housing;
   means to provide relative translational axial motion between said shaft means and said joint means;
   said shaft means transmitting the socket plate restraining torque to said compressor housing;
   whereby socket plate rotation is prevented and torsional vibration is substantially eliminated.

2. An assembly for providing torque restraint of a socket plate for a variable displacement wobble plate compressor having a fixed housing and cylinder block and a rotatable drive hub, comprising:
   a non-rotary cross groove joint for restraining torque applied to said socket plate by said hub and for reducing vibration, said joint including a cylindrical outer race, a cylindrical inner race, crossing grooves with longitudinal axes that intersect on said races, a plurality of torque receiving balls movable in the cooperating grooves and a cage for properly maintaining the annular position of said torque receiving balls;
   said groves and said cage cooperating to position said balls in a single torque transmission plane between said plate and said drive hub;
   a centrally located anti-rotational shaft connected to the inner surface of said joint; and
   means for mounting said anti-rotational shaft against translational axial and rotational motion; and
   said inner race being formed on said shaft to provide relative translational axial motion between said shaft means and said joint means so as to transmit the socket plate restraining torque through said balls of said joint and to said compressor housing, whereby socket plate rotation is prevented and torsional vibration is substantially eliminated.

3. An assembly for providing torque restraint of a socket plate for a variable displacement wobble plate compressor having a fixed housing and cylinder block, a drive shaft and a rotatable drive hub, comprising:
   a non-rotary cross groove joint for restraining torque applied to said socket plate and for reducing vibration, said joint including an outer cylindrical race, an inner cylindrical race, crossing grooves with longitudinal axes that intersect in said inner and outer races, a plurality of torque receiving balls and a cage for properly maintaining the annular position of said torque receiving balls;
   an anti-rotational sleeve forming said inner race of said cross groove joint and fixed to said housing;
   said balls on said inner race being effective to provide for translational movement of said socket plate;
   said drive shaft being mounted for rotation in said sleeve;
   separate radial and thrust bearing means for mounting said socket means; and
   passage means for providing lubricating fluid in the grooves of said outer race of said joint to said bearing means,
   whereby socket plate rotation is prevented and torsional vibration is substantially eliminated.

* * * * *